United States Patent
Ikeda et al.

(10) Patent No.: US 7,606,914 B2
(45) Date of Patent: Oct. 20, 2009

(54) SESSION QOS CONTROL APPARATUS

(75) Inventors: Hiroki Ikeda, Beijing (CN); Shiro Tanabe, Hidaka (JP); Kazuma Yumoto, Fuchu (JP); Masashi Yano, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 746 days.

(21) Appl. No.: 10/985,944

(22) Filed: Nov. 12, 2004

(65) Prior Publication Data

US 2005/0117586 A1 Jun. 2, 2005

(30) Foreign Application Priority Data

Nov. 12, 2003 (JP) .................. 2003101142957

(51) Int. Cl.
 *G06F 15/16* (2006.01)
(52) U.S. Cl. ..................... 709/228; 709/223
(58) Field of Classification Search ............ 370/395, 370/389; 709/223, 232, 228; 455/455
 See application file for complete search history.

(56) References Cited

U.S. PATENT DOCUMENTS

| | | | | |
|---|---|---|---|---|
| 6,760,312 | B1* | 7/2004 | Hitzeman | 370/252 |
| 6,970,930 | B1* | 11/2005 | Donovan | 709/227 |
| 7,031,301 | B1* | 4/2006 | Oz et al. | 370/352 |
| 7,266,595 | B1* | 9/2007 | Black et al. | 709/223 |
| 2004/0049570 | A1* | 3/2004 | Frank et al. | 709/223 |
| 2004/0109414 | A1* | 6/2004 | Choi et al. | 370/230 |
| 2004/0165587 | A1 | 8/2004 | Kiyoto et al. | |
| 2005/0021777 | A1* | 1/2005 | Nakao et al. | 709/228 |

FOREIGN PATENT DOCUMENTS

JP 2004-146973 5/2004

OTHER PUBLICATIONS

Rosenberg, J., et al, Network Working Group: RFC 3261/*Sessions Initiation Protocol*; pp. 1-49; Jun. 2002.
Baize, E., et al, "Network Working Group: RFC 24778/*The Simple and Protected GSS-API Negotiation Mechanism*," pp. 1-18; Dec. 1998.

* cited by examiner

*Primary Examiner*—Salad Abdullahi
*Assistant Examiner*—Anthony Mejia
(74) *Attorney, Agent, or Firm*—Antonelli, Terry, Stout & Kraus, LLP.

(57) ABSTRACT

A session QoS control apparatus includes a session management database in which session management information per user terminal is stored, a user preference database in which user preference information representing the user state and QoS requirement associated with the identifier of a user communication terminal is stored, and a user communication terminal and router management database in which mapping between a user terminal and a network node to which the terminal is connected is stored. Upon receiving user session information, the apparatus analyses the user session information by referring to the session management and user preference databases and determines a QoS policy for the session between caller and callee terminals. From the user communication terminal and router management database, the apparatus retrieves a node on which the session QoS policy should be set and transmits a QoS command to the node to set the session QoS policy on the node.

6 Claims, 8 Drawing Sheets

FIG.6

| SIP-URL | LOCATION | IP ADDRESS | ... | QoS REQUIREMENT |
|---|---|---|---|---|
| SIP:userA@192.168.100.10 | office | 192.168.10.1 | ... | Gold |
| SIP:userA@192.168.100.10 | home | 192.168.10.2 | ... | NA |
| SIP:userB@192.168.100.20 | office | 192.168.20.1 | ... | Silver |
| SIP:userB@192.168.100.20 | home | 192.168.20.2 | ... | NA |

FIG.7

```
v=0
o=userA 2890844526 2890842807 IN IP4 192.168.10.1
s=QoS enable VoIP
i=A VoIP with Quality of Service Control
u=http://www.qos.com/userA/voip.txt
e=userA@qos.com
c=IN IP4 192.168.20.1
t=2873397496 2873404696
a=recvonly
m=audio 49170 RTP/AVP 0
```

FIG.8

| CALL-ID | TO TAG | FROM TAG | SOURCE ADDRESS | SOURCE PORT | DESTINATION ADDRESS | DSCP VALUE |
|---|---|---|---|---|---|---|
| A84b4c76e66710 | a6c85cf | 1928301774 | 192.168.10.1 | 49170 | 192.168.20.1 | 0x001010 |
| ... | ... | ... | ... | ... | ... | ... |

FIG.9

| IP ADDRESS OF COMMUNICATION TERMINAL | IP ADDRESS OF NODE |
|---|---|
| 192.168.10.1 | 192.168.100.1 |
| | |

SESSION QOS CONTROL APPARATUS

BACKGROUND OF THE INVENTION

The present invention relates in general to a communication apparatus using a SIP protocol, and, more particularly, the invention relates to a QoS (Quality of Service) control method for routers on a network, based on user preference information.

In peer-to-peer communication, in which a one-to-one connection is established between corresponding end users, a session between user communication terminals is established by a session control protocol typified by the Session Initiation Protocol (SIP) specified in the Request for Comments (RFC) 3261, a Recommendation for Internet Standards, and a communication of real-time data, such as audio and video, is performed in the session. In the use of SIP, a SIP server that relays session control messages locates a callee's terminal and effects the management of session information, such as terminal information and peer-to-peer communication information. Besides, to satisfy calling and called user requirements, session control for the users is performed, based on a database, which is called a user preference.

On the other hand, network operators, such as communication carriers and Internet Service Providers (ISPs), rely on communication quality assurance policies and routing control policies, which are generally called policies. The policies are managed by a policy server in an integrated manner, and a great number of nodes constituting a network and the QoS of the network are controlled by the policy server. A known protocol for policy servers is, e.g., a Common Open Policy Service (COPS) protocol specified in RFC 2478, a Recommendation for Internet Protocol, developed by the Internet Engineering Task Force (IETF) and published by the Internet Architecture Board (IAB).

The following method for priority control of packets in a particular flow on a network is known. For example, a relay node, called an edge node, which is located on the boundary of the network, classifies the packets flowing in the network into a plurality of classes of priority control; and, in the header of each packet flowing in, it sets one of "Diffserv Code Point (DSCP)" values that correspond to the classes of priority control for the packets. A relay node, called a core node, which is located at an inner point of the network, performs priority control and forwarding of the packets it has received, according to the DSCP value included in the header of every packet it received and in compliance with a predetermined rule. This technique is called Differentiated Services (Diffserv) and, e.g., as in Internet Protocol (IP) telephony, it is used to decrease a delay in transferring real-time packets, such as voice packets, and video packets on the IP network, e.g., such as an IP telephony network.

The constitutions of a known session QoS control apparatus and a known policy server are shown in FIG. 10. The session QoS control apparatus comprises a session management database 150 and a session information analysis means 110. The policy server comprises a user communication terminal and router management database 170 and a means for communication with a router 130.

As the network scale expands and VoIP users grow, in the method in which QoS information for all sessions of the VoIP communication terminals must be set on the nodes beforehand, the loads on the nodes will increase, resulting in an increase of the delay in relaying real-time packets. Also, this method is unable to change a QoS information setting or the like in real time, responsive to a change in the states of VoIP users. Because the SIP is a Layer 7 technique, there is also a problem in which the SIP server is incapable of direct control over the QoS of the network.

Furthermore, because the policy server cannot detect the start and end of a session communication between VoIP communication terminals, the policy server's operator must set a policy for each node in response to the start and end of VoIP communication, a change of the user state, and a change of the session condition. However, with expansion of the network, a frequent policy setting will be needed, and a situation where the operator's setting operation cannot keep up with the need will occur.

SUMMARY OF THE INVENTION

It is an object of the present invention to provide a session QoS control apparatus which does not require the operator to perform policy setting, which can prevent a delay caused by superfluous policy setting in relaying packets at each node, and which can prevent an increase in the loads on terminals.

In order to solve the above-described problems, in session communication between users for which a QoS policy setting is enabled, QoS information is added to a SIP user preference database in accordance with the present invention. Based on the SIP user preference database and SIP messages, the QoS requirement per user is identified, and an appropriate QoS policy is set on the nodes to which caller and callee terminals are connected, respectively.

More specifically, a session QoS control apparatus in accordance with the present invention comprises a session management database in which management information for sessions between user communication terminals is stored; a user communication terminal and router management database in which mapping between a user communication terminal and a network node to which the terminal is connected is stored; a user preference database in which user preference information representing a user requirement associated with the identifier of a user communication terminal is stored; a session information analysis means which analyses the session state of a user terminal by referring to the session management database and the user preference database; and a session QoS control means which determines a Quality of Service (QoS) policy for a user session, based on the result of session analysis performed by the session information analysis means, which identifies a router on which the QoS policy should be set or canceled from the user communication terminal and router management database, and which generates a session QoS command addressed to the router.

The session QoS command generated by the session QoS control means is transmitted to the destination router through the means for communication with a router and the session QoS policy setting or cancellation is performed on the router. Upon receiving user session information indicating a change of user state and/or a change of session condition from a user communication terminal, the session information analysis means analyses the session state of the user terminal and updates the user preference information in the user preference database, according to the result of the session analysis.

According to the present invention, in a VoIP communication for which a QoS policy setting is enabled, the following can be implemented: adding QoS information to the SIP user preference database, identifying the QoS requirement for a SIP user session, and setting a QoS level per user session. Also, by eliminating the need for manual policy setting by an operator, the invention can prevent a delay caused by superfluous policy setting in relaying packets at each node, as well as prevent an increase in the loads on terminals.

BRIEF DESCRIPTION OF THE DRAWINGS

FIG. 6 is a diagram which illustrates an example of the structure of a user preference database 160 which is used by the session QoS control apparatus of the present invention;

FIG. 7 is a diagram which illustrates an example of user session information described in SIP messages (INVITE message and OK message) which are exchanged between the session QoS control apparatuses of the present invention;

FIG. 8 is a diagram which illustrates an example of the structure of a session information management database which is used by the session QoS control apparatus of the present invention;

FIG. 9 is a diagram which illustrates an example of the structure of a user communication terminal and router management database which is used by the session QoS control apparatus of the present invention.

DETAILED DESCRIPTION OF THE PREFERRED EMBODIMENTS

An embodiment of the present invention will be discussed hereinafter in an illustrative case where VoIP is used as the application, the Session Initiation Protocol (SIP) is used as the user session control protocol, and a Common Line Interface (CLI) is used as the policy setting protocol. However, the present invention is not limited to the combination of the VoIP and the above-stated protocols.

Figure 1:
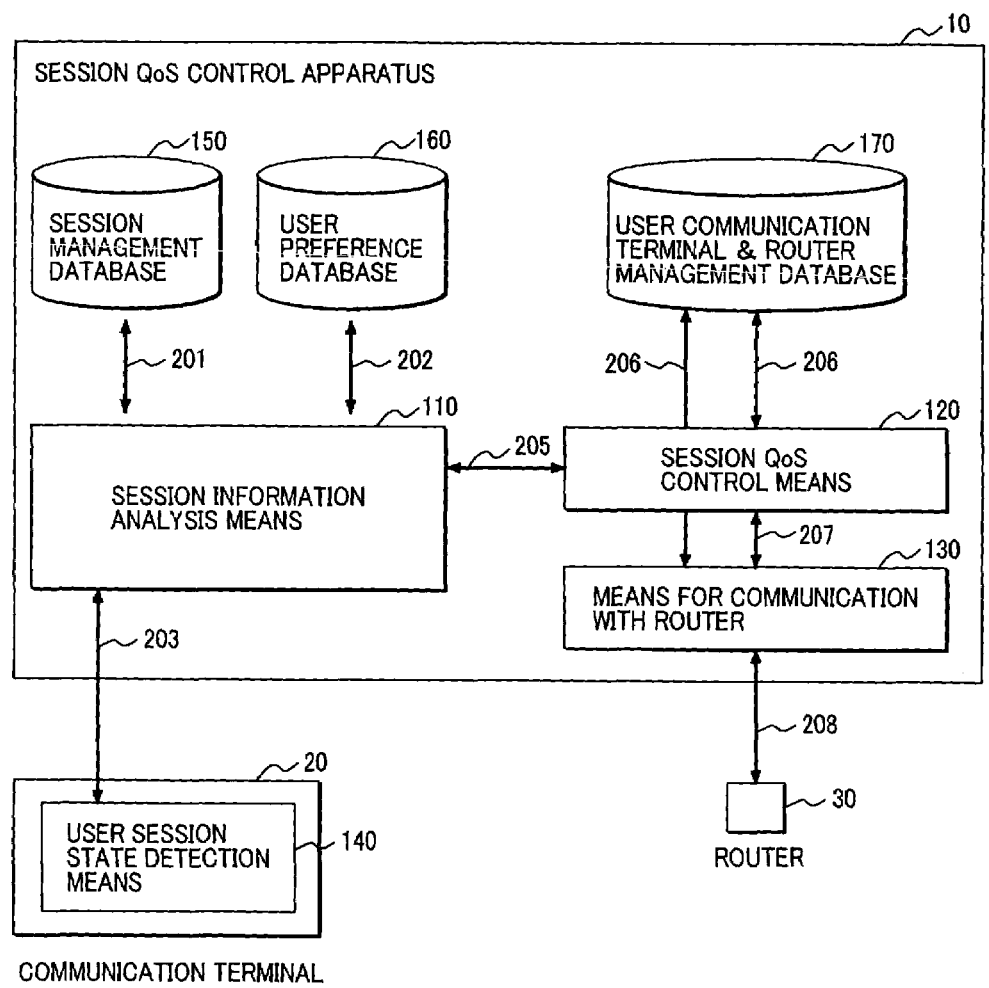
FIG. 1 is a block diagram of an apparatus using the session QoS control method of the present invention.

FIG. 1 is a block diagram of a session QoS control apparatus 10 to which the session QoS control method of the present invention is applied.

The session QoS control apparatus 10 of the present invention is comprised of a session management database 150 in which session management information 201 for sessions between user communication terminals is stored, a user preference database 160 in which user preference information 202 representing the states of users and user requirements is stored, a user communication terminal and router management database 170 in which user communication terminal and router management information representing what user communication terminal connects to what node (router) is retained, a session information analysis means 110 which receives user session information 203 from a user communication terminal and analyses the session state of the user terminal by referring to the session management information 201 and the user preference information 202 retrieved from the databases 150 and 160, respectively, a session QoS control means 120 which determines a Quality of Service (QoS) policy for a user session, based on session analysis result information 205 that is output from the session information analysis means 110, identifies a router on which the QoS policy should be set or canceled, based on the user communication terminal and router management information 206, and generates a session QoS command addressed to the router, and a means for communication with a router 130 which transmits the session QoS command to the destination router 30.

However, this embodiment may be modified such that the session QoS control means 120 passes the user session QoS policy 207 to the means for communication with a router 130, and the means for communication with a router 130 generates the session QoS command 208, based on the user session QoS policy 207 and the user communication terminal and router management information 206, and transmits this command.

Here, it is assumed in the initial state that the database 160 contains preset user preference information and that the database 170 contains preset user communication terminal and router management information. The user session information 203 indicates a change of user terminal (user) and/or a change of session communication condition detected by a user session state detection means 140 provided in a user communication terminal.

As described above, the gist of the present invention is such that, in a VoIP communication that is performed on an IP network, the session QoS control apparatus 10 receives a SIP message transmitted from a user communication terminal (VoIP terminal) 20, the session QoS control apparatus 10 generates a session QoS policy, based on the VoIP user preference, and, by way of the CLI, the QoS policy information is set on the node 30 to which the VoIP communication terminal is connected.

Figure 2:
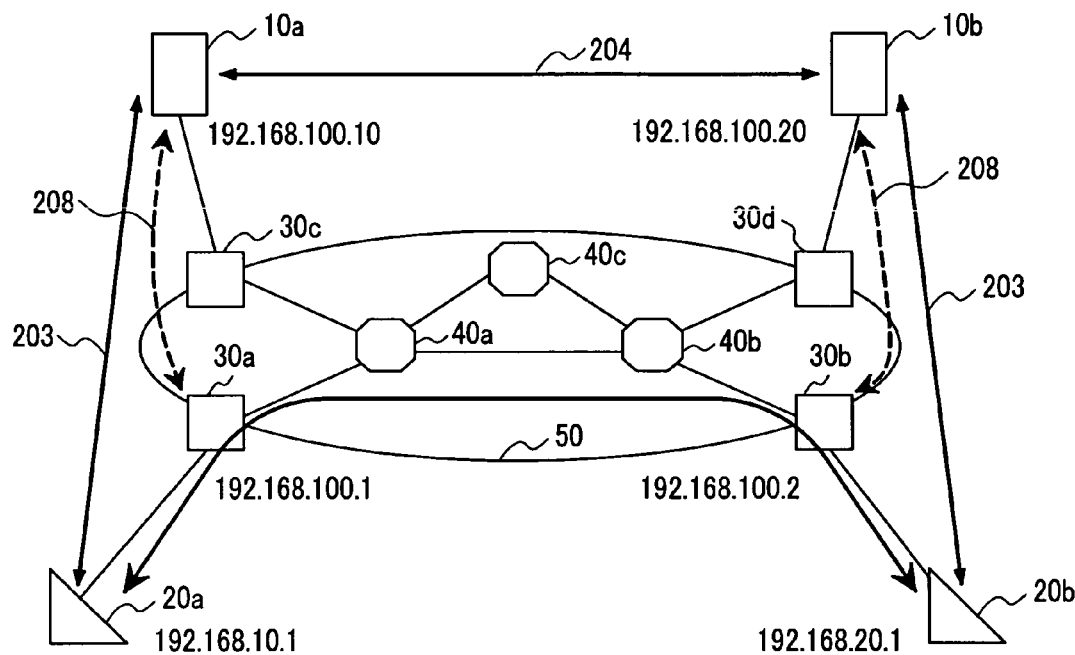
FIG. 2 is a diagram which illustrates an example of network topology to which the session QoS control method of the present invention is applied.

FIG. 2 shows an IP network in which Diffserv-based QoS control is performed as an example of network topology to which the session QoS control method of the present invention is applied. More specifically, the diagram here is used to explain the network topology where a VoIP terminal 20a with an IP address of "192.168.10.1" communicates with a VoIP terminal 20b with an IP address of "192.168.20.1" via the IP network 50 in which QoS can be controlled and the session QoS control operation.

When initiating communication with the VoIP communication terminal 20b, the VoIP communication terminal 20a transmits a SIP message to a session QoS control apparatus 10a of the present invention with an IP address of "192.168.100.10". The SIP message transmitted by the VoIP communication terminal 20a is transferred from the session QoS control apparatus 10a to a session QoS control apparatus 10b with an IP address of "192.168.100.20". Then, it is transferred from the session QoS control apparatus 10b to the VoIP communication terminal 20b.

During this message transfer, both the session QoS control apparatuses 10a and 10b analyze the received SIP message and determine a session QoS policy, based on the user preference database 160. The session QoS control apparatus 10a transmits the session QoS policy determined by it to an edge node 30a with an IP address of "192.168.100.1" to which the communication terminal 20a is connected, using the CLI. Also, the session QoS control apparatus 10b transmits the session QoS policy determined by it to an edge node 30b with an IP address of "192.168.100.2" to which the communication terminal 20b is connected, using the CLI. In some implementation, the session QoS policy may be transmitted to core nodes in addition to the edge nodes. By this notification of the session QoS policy, the QoS policy is set on each edge node so that VoIP packets are transferred preferentially and the VoIP service quality can be assured.

Figure 3:
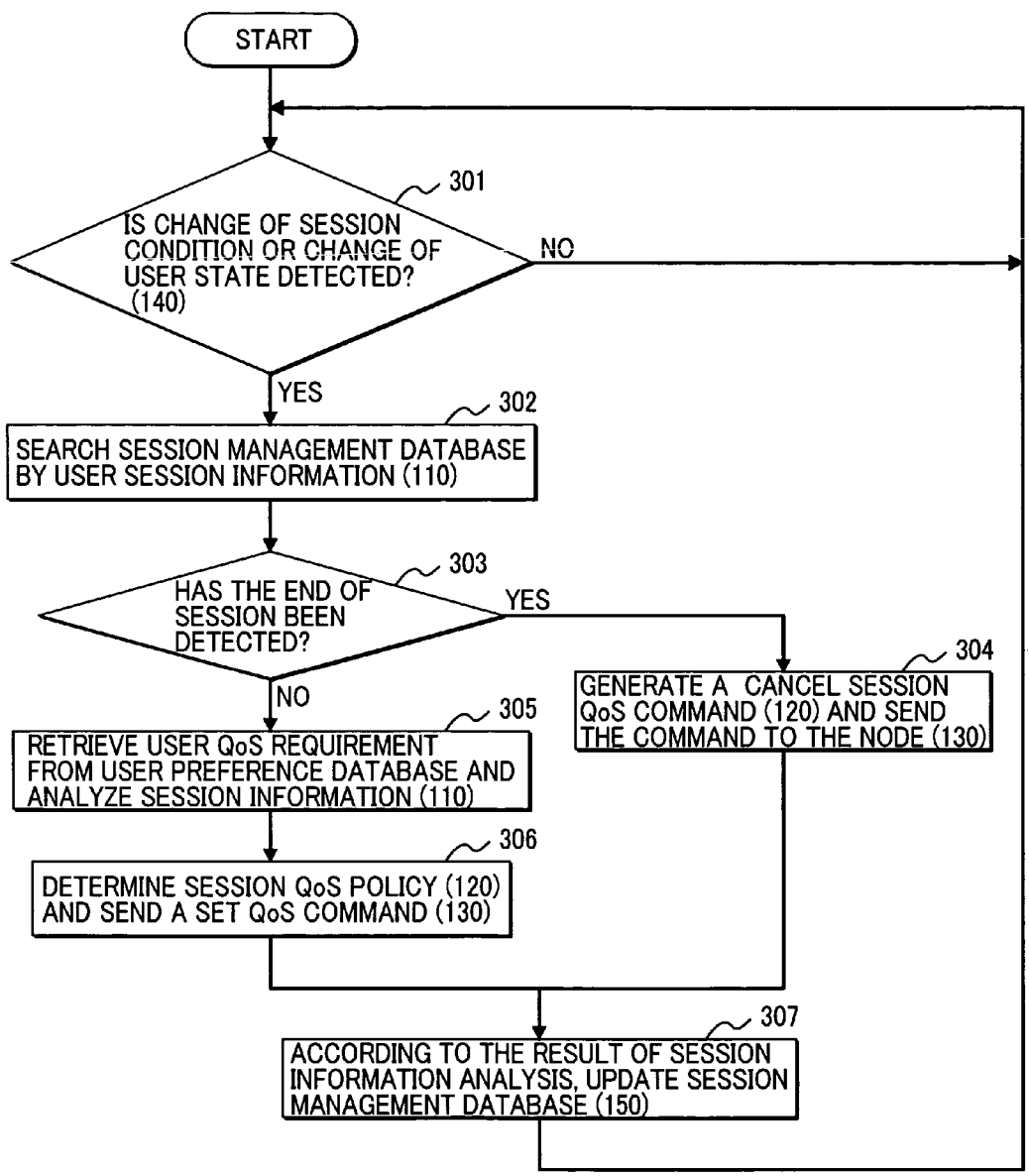
FIG. 3 is a flowchart describing the operation by the session QoS control method of the present invention.

FIG. 3 is a flowchart describing the operation according to the session QoS control method of the present invention.

Referring to the session QoS control apparatus 10 shown in FIG. 1, the session QoS control method of the present invention will be explained below.

The communication terminal 20 checks for a change of session condition and a change of user state by the user session state detection means 140. In the case where, for example, the VoIP application runs, when the user session state detection means 140 detects a change of voice quality in the session or an IP address change as the user involved in the session moves, it transmits an SIP message including user session information to the session QoS control apparatus 10.

When the session information analysis means 110 of the session QoS control apparatus 10 detects the change of session condition and/or the change of user state (301) by the user session information, it searches the session management database by the above user session information (302) and judges the operating status of the session. The SIP message includes, e.g., the IP address and port number of the VoIP terminal, the IP address of the callee terminal, and the like as the user session information. From the SIP message, media information such as audio and video can be extracted and QoS setting according to the media information can also be performed.

The session information analysis means 110 determines whether the end of the session has been detected (303). If the end of the session has been detected, the session QoS control means 120 generates a cancel session QoS command to clear the QoS policy of the session. The command is transmitted through the means for communication with a router 130 to the appropriate node and the QoS setting is canceled (304). In the case where, for example, the Differserv technique is used, a policy to clear the DSCP value for the session is generated and transmitted to the node and the QoS setting is cancelled. Thereafter, the session information analysis means 110 updates the session management database 150, according to the result of the session information analysis (307).

Otherwise, if the end of the session has not been detected in step 303, the session information analysis means 110 retrieves the QoS requirement of the user from the user preference database 160 and analyses the session information (305). According to the result of this session analysis, the session QoS control means 120 determines a session QoS policy and generates a set QoS command. This command is transmitted through the means for communication with a router 130 to the appropriate node (306). In the case where, for example, the Differserv technique is used, after a DSCP value for the session is determined, the session QoS policy is generated and transmitted to the node and the QoS policy is set. The session information analysis means 110 updates the session management database 150, according to the result of the session information analysis (307).

Figure 4:
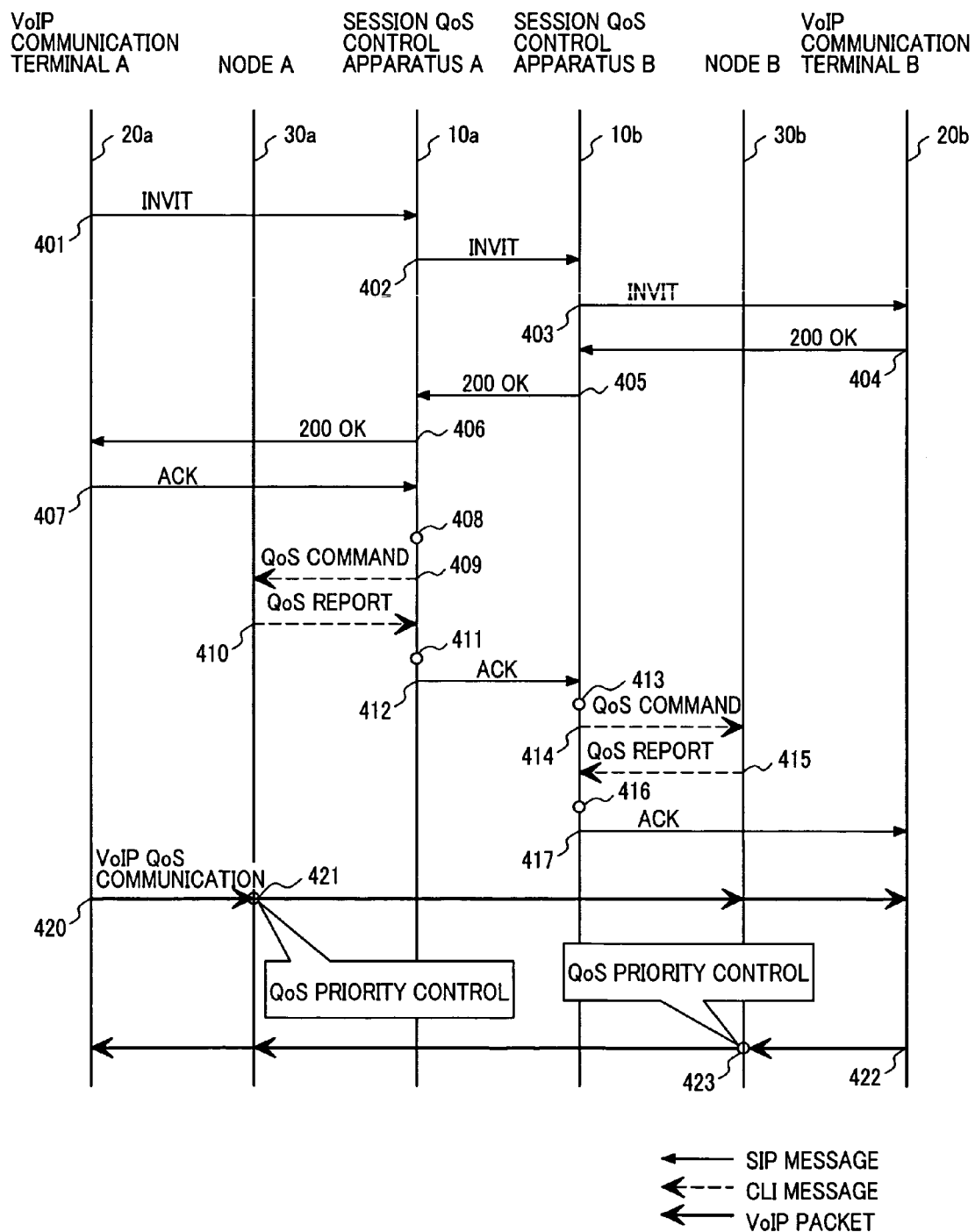
FIG. 4 is a sequence diagram illustrating the procedure for QoS setting for a session between communication terminals by the session QoS control apparatus of the present invention.

FIG. 4 is a sequence diagram which illustrates the procedure for QoS setting for a session between communication terminals by the session QoS control apparatuses of the present invention. The diagram here shows the sequence in the case where the SIP is applied as the user session control protocol and VoIP is used as the application.

One VoIP communication terminal A (20a) transmits an INVITE message 401 that is a request asking the callee to establish a two-party session to one session QoS control apparatus A (10a). Having received the INVITE message, the session QoS control apparatus A (10a) analyzes the session information described in the INVITE message, stores the session information into the session management database, and transfers the INVITE message 402 to the other session QoS control apparatus B (10b). The session QoS control apparatus B (10b), in turn, transfers the INVITE message 403 to the other VoIP communication terminal B (20b).

Having received the INVITE message, the VoIP communication terminal B returns an OK message (success indication) 404 to the session QoS control apparatus B (10b) when it has become ready to establish the session. Having received the OK message 404, the session QoS control apparatus B (10b) transfers the OK message 405 to the session QoS control apparatus A (10a). The session QoS control apparatus A (10a), in turn, transfers the OK message 406 to the VoIP communication terminal A. Having received the OK message, the VoIP communication terminal A establishes the two-party session and transmits an ACK message 407 that indicates the start of VoIP communication to the session QoS control apparatus A (10a).

Having received the ACK message, the session QoS control apparatus A (10a) analyzes the user session information, based on the session information that has been stored on the session management database 150, and generates a session QoS command. Also, it retrieves the node A to which the caller terminal A is connected from the terminal and router management database 170 and transfers the session QoS command 409 to the node A (408).

The node A (30a) sets the QoS policy for the user session, based on the received session QoS command, and responds by returning a session QoS report 410 indicating that the QoS setting has been completed to the session QoS control apparatus A (10a).

Upon having received the session QoS report, the session QoS control apparatus A (10a) transfers the ACK message 412 to the session QoS control apparatus B (10b) (411). However, the session QoS control apparatus A (10a) may proceed to the next action immediately after transmitting the session QoS command without waiting for the reception of the session QoS report from the node A.

Having received the ACK message, the session QoS control apparatus B (10b) transmits a session QoS command 414 to the node B to which the callee terminal B is connected as the session QoS control apparatus A (10a) does (413). The node B sets the QoS policy for the user session, based on the session QoS command, and responds by returning a session QoS report 415 indicating that the QoS setting has been completed to the session QoS control apparatus B (10b). Upon having received the session QoS report, the session QoS control apparatus B (10b) transfers the ACK message 417 to the VoIP communication terminal B (20b).

Through the foregoing operation, QoS policy setting on each edge node is completed. Thereafter, the node A (30a) attaches QoS control information (421) to a VoIP packet 420 that has been transmitted from the VoIP communication terminal A (20a), and the node B (30b) attaches QoS control information (423) to a VoIP packet 422 that has been transmitted from the VoIP communication terminal (20b). Thus, packets for which QoS is controlled are transferred on the network 50.

Figure 5:
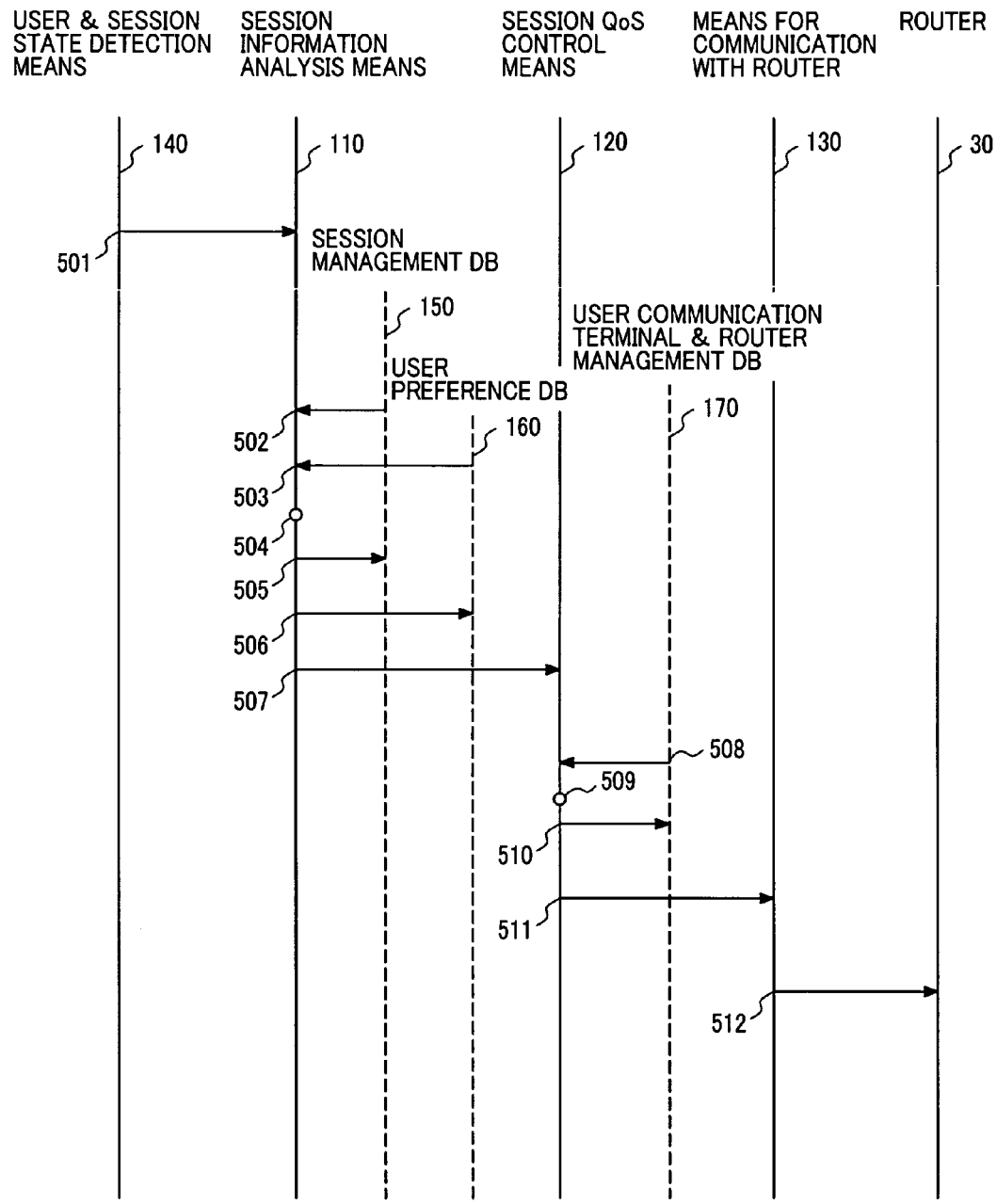
FIG. 5 is a sequence diagram illustrating the procedure for QoS setting by the session QoS control method of the present invention.
Figure 10:
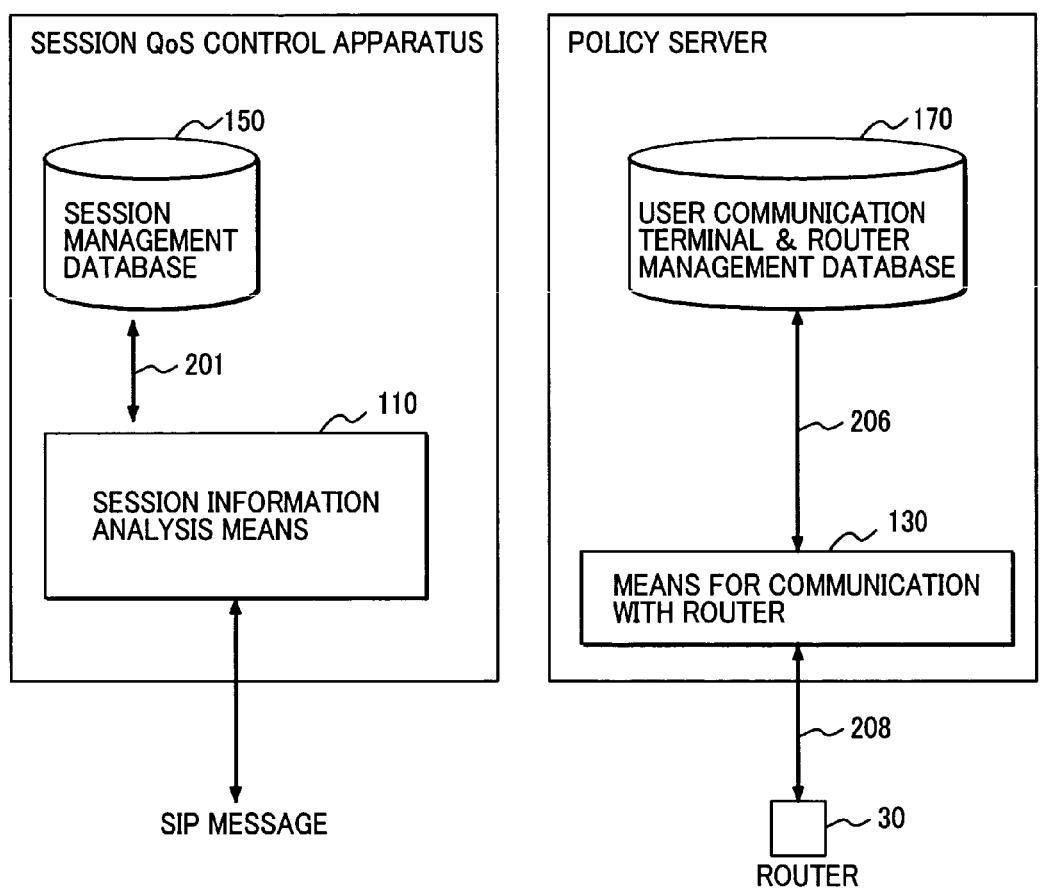
FIG. 10 is a diagram showing a known session QoS control apparatus.

FIG. 5 is a sequence diagram illustrating the procedure for QoS setting by the session QoS control method of the present invention.

The user session state detection means 140 provided in the VoIP communication terminal transmits user session information denoting a detected state change to the session information analysis means 110 of the session QoS control apparatus 10 (501). Based on the received user session information, the session information analysis means 110 retrieves the current session management information from the session management database 150 (502) and the registered user's requirement information from the user preference database 160 (503). Then, it analyses the user session information in order to determine the session operation (504). The user session information includes the voice quality measured at the VoIP communication terminal, a change of the session state as the user moves, and the like.

After analyzing the session information, the session information analysis means 110 updates the session management database 150 (505) and the user preference database 160 (506), based on the analysis result. Then, it sends the session analysis result to the session QoS control means 120 (507).

Having received the session analysis result, the session QoS control means 120 retrieves what network node to which the user terminal is connected from the user communication terminal and router management database 170 (508) and generates a session QoS command (509). Then, it updates the user communication terminal and router management database 170, if necessary, (510) and passes the session QoS command to the means for communication with a router (511), which then transmits the command to the appropriate node (512).

FIG. 6 illustrates an example of the structure of the user preference database 160 which is used by the session QoS control apparatus of the present invention.

The user preference database stores information for controlling the session QoS state according to user requirements. For example, for a user identified by SIP URL, its QoS requirement can be changed according to the user state and session condition. In this example, each row of the database is a record for one SIP Uniform Resource Locator (URL) associated with other items, such as location and IP address. When, for example, the SIP URL of a user is "SIP: userA@192.168.100.10" and the user location is office, its QoS requirement is set to the highest bevel "Gold." Even for the same user, when the user location is home, its QoS requirement is set to the lowest level "NA."

FIG. 7 illustrates an example of user session information described in SIP messages (INVITE message and OK message) which are exchanged between the session QoS control apparatuses of the present invention.

In the SIP, a session message is described in a Session Description Protocol (SDP). In the description example shown in FIG. 7, a source IP address of "102.168.10.1", a destination IP address of "192.160.20.1", a source port number of "49170", a transmission of "Audio" data media, and a Real time Transport Protocol (RTP) serving as the transmission protocol are specified.

FIG. 8 illustrates an example of the structure of the session information management database 150 which is used by the session QoS control apparatus of the present invention.

The session information management table stores information for identifying each session. In this example, each row of the database is a record for one session communication, consisting of Call-ID to uniquely identify a SIP-based session, To-tag, From-tag, the source IP address and port number for session communication, the destination IP address, and the priority control level in relaying packets. Here, the DSCP values that are used in the Diffserv technique are employed to specify the priority control level in relaying packets.

FIG. 9 illustrates an example of the structure of the user communication terminal and router management database 170 which is used by the session QoS control apparatus of the present invention.

The user communication terminal and router management database stores information on what user communication terminal is connected to what router, which is required for QoS policy setting. Particularly in the case of the IP network, this table stores mapping between the IP address of a user communication terminal and the IP address of a router. In this example, each row of the database is a record for one communication terminal (VoIP communication terminal), consisting of the IP address of the communication terminal and the IP address of the node on which a QoS policy must be set for QoS priority control of packets transmitted from the communication terminal.

As described above, according to the present invention, in a VoIP communication for which the QoS policy setting is enabled, the following can be implemented: adding QoS information to the SIP user preference database, identifying the QoS requirement for a SIP user session, and setting a QoS level per user session. Also, by eliminating the need for manual policy setting by the operator, the invention can prevent a delay caused by superfluous policy setting in relaying packets at each node, as well as an increase in the loads on terminals.

What is claimed is:

1. A session QoS control apparatus which relays control information for a communication session between user communication terminals, comprising:

a session management database in which management information for sessions between user communication terminals is stored;

a user communication terminal and router management database in which mapping between a user communication terminal and a network node to which the terminal is connected is stored;

a user preference database in which-user preference information representing a user requirement associated with the identifier of a user communication terminal is stored;

a session information analysis means which analyses the session state of a user terminal by referring to said session management database and said user preference database; and a session QoS control means which determines a Quality of Service (QoS) policy for a user session, based on the result of session analysis performed by said session information analysis means, identifies a router on which the QoS policy should be set from said user communication terminal and router management database, and generates a session QoS command addressed to the router;

wherein for every occurrence of user session information indicating a change of user state and/or a change of session condition from a user communication terminal: said session information analysis means analyses the session state of the user terminal in real-time by referring to said session management database and said user preference database; and, said session QoS control means determines the QoS policy for the user session in real-time, based on the result of session analysis performed by said session information analysis means.

2. The session QoS control apparatus according to claim 1, comprising: a means for communication with router which transmits the session QoS command generated by said session QoS control means to said router.

3. The session QoS control apparatus according to claim 1, wherein: said user preference database stores information corresponding to QoS required by a user beforehand as a part of the user preference information.

4. The session QoS control apparatus according to claim 1, wherein: said user session information includes user voice quality.

5. The session QoS control apparatus according to claim 1, wherein: said session information analysis means updates the user preference information in said user preference database, according to the result of the session analysis.

6. The session QoS control apparatus according to claim 1, wherein: the session management information that is stored into said session management database includes the source IP address, destination P address, source port number for a user session.

* * * * *

UNITED STATES PATENT AND TRADEMARK OFFICE
CERTIFICATE OF CORRECTION

| | | |
|---|---|---|
| PATENT NO. | : 7,606,914 B2 | Page 1 of 1 |
| APPLICATION NO. | : 10/985944 | |
| DATED | : October 20, 2009 | |
| INVENTOR(S) | : Ikeda et al. | |

It is certified that error appears in the above-identified patent and that said Letters Patent is hereby corrected as shown below:

Title Page, Item (30), delete "(JP)" and change to --(CN)--.

Signed and Sealed this

Thirtieth Day of March, 2010

David J. Kappos
*Director of the United States Patent and Trademark Office*